Figure 1:
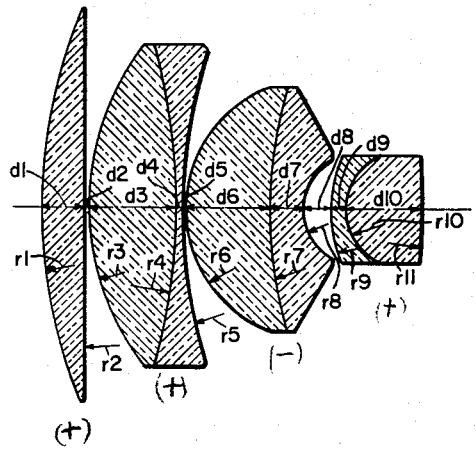

Johannes BECKER
Henricus W. BULTHUIS

INVENTORS

United States Patent Office 2,978,957
Patented Apr. 11, 1961

2,978,957

OPTICAL LENS SYSTEM HAVING A RELATIVE APERTURE LARGER THAN f/1

Johannes Becker, Delft, and Henricus Wilhelmus Bulthuis, The Hague, Netherlands, assignors to N.V. Optische Industrie de Oude Delft, Delft, Netherlands, a corporation of the Netherlands Filed Mar. 23, 1959, Ser. No. 801,361

Claims priority, application Netherlands Apr. 3, 1958

3 Claims. (Cl. 88—57)

The invention relates to an optical lens system for photography, projection and the like having a relative aperture larger than f/1, which system is corrected for aberrations in a flat field and is made up of the following four components, listed in the order in which they are traversed by the light rays when the lens is used as a photographic objective:

(a) a convergent front element;
(b) a compound convergent second component made up of a convergent and a divergent element and having the form of a meniscus which is convex towards the front;
(c) a compound third component also having the form of a meniscus which is convex towards the front and being made up of a convergent and a divergent element, the total axial thickness of this component being at least 0.35 $f$ where $f$ is the equivalent focal length of the system, the convergent element being made of a material having a mean refractive index not less than 0.04 lower than that of the divergent element;
(d) a compound fourth component comprising a divergent and a convergent part and having a convex front surface, the rear surface of the component having a radius of curvature not less than 2 $f$ and the total axial thickness of this component being at least 0.3 $f$.

An optical lens systems built in accordance with the above conditions is described in the British patent specification 696,902. According to this specification a corrected lens of extremely large relative aperture (f/0.74) can be obtained among other things by selecting for the convergent front element and the convergent element of the second component glasses having extremely high refractive indices and relatively low dispersions, more particularly rare earth oxide glasses. In the example disclosed in the specification for the above mentioned elements glasses are used having mean refractive indices of $n_d = 1.717$ and 1.691 and Abbe numbers of $\nu = 47.9$ and 54.8 respectively.

As is well-known in the art glasses of this type are difficult to produce and can be obtained in small amounts per melt only. Consequently they can only be supplied in discs of limited dimensions whose price is, moreover, very much higher than those of the conventional types of glass. In general, these objections grow the more serious the higher the required refractive index is and constitute an effective limitation to the application of the prior system as a large aperture objective of long focal length, e.g. longer than 10 cm.

The invention has for its object to provide a lens system of the type indicated which is well corrected for all aberrations in a flat field without necessitating the use of glasses for the elements having the largest dimensions, in particular the front element and the convergent element of the second component, which in effect constitute limitations as to the possible focal length of the system or its price.

According to the invention the refractive index of the glass of the front component is lower than 1.65 and that of the glass of the convergent element of the second component is lower than 1.675, the latter index being not less than 0.02 and not more than 0.04 lower than the refractive index of the glass of the divergent element of the second component, the radius of curvature of the dividing surface between the convergent and divergent elements of the second component lying between 1.5 $f$ and 3 $f$ and the axial thickness of the front element being smaller than 0.2 $f$.

It is preferable, in accordance with the invention, to make the front element as a single meniscus which is convex towards the front and to select the radius of curvature of the front surface of the front element between $f$ and 2.2 $f$ and that of its rear surface between 10 $f$ and $\infty$.

Figure 2:
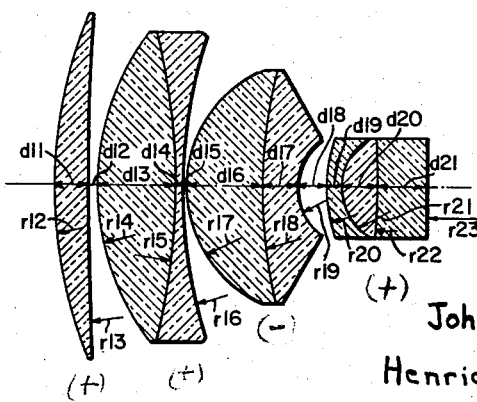

Some illustrative embodiments of the lens system according to the invention are shown in the drawing in which Fig. 1 is an objective having a relative aperture of f/0.7 and a field angle of 15°, which is corrected for an infinite object distance, Fig. 2 shows an objective which is likewise corrected for infinity and has a slightly lower relative aperture of f/0.75 with a larger useful field angle of 21°.

The data of the systems shown in Figs. 1 and 2 have been gathered in Tables I and II, respectively. The notation employed may be seen from the drawing. The equivalent focal length $f$ of the systems in 100, ($r_1$ to $r_{23}$) are the radii of the several lens surfaces counting from the front to the rear, and ($d_1$ to $d_{21}$) are the corresponding axial thicknesses and separations between the several lens surfaces.

*Table I*

[f/0.7; field 15°; f=100. Fig. 1]

| Radii of curvature | Axial Thickness or separation | Mean refractive index ($n_d$) | Abbe number $\nu$ |
|---|---|---|---|
| $r_1 =$ 195.31 | $d_1 =$ 16.20 | 1.5827 | 46.5 |
| $r_2 =$ 2,456.75 | $d_2 =$ 1.5 | | |
| $r_3 =$ 102.40 | $d_3 =$ 34.10 | 1.6516 | 58.5 |
| $r_4 =$ —234.52 | $d_4 =$ 2.6 | 1.6889 | 31.2 |
| $r_5 =$ 199.70 | $d_5 =$ 0.4 | | |
| $r_6 =$ 51.28 | $d_6 =$ 34.5 | 1.6516 | 58.5 |
| $r_7 =$ 204.29 | $d_7 =$ 13.6 | 1.7482 | 27.8 |
| $r_8 =$ 22.39 | $d_8 =$ 11.8 | | |
| $r_9 =$ 53.08 | $d_9 =$ 6.2 | 1.5633 | 50.8 |
| $r_{10}=$ 22.73 | $d_{10}=$ 29.4 | 1.7340 | 50.9 |
| $r_{11}=$ —332.57 | | | |

Table II

[f/0.75; field 21°; f=100. Fig. 2]

| Radii of curvature | Axial Thickness or separation | Mean refractive index ($n_d$) | Abbe number $\nu$ |
|---|---|---|---|
| $r_{12}$ = 176.74 | | | |
| | $d_{11}$ = 15.14 | 1.5831 | 59.3 |
| $r_{13}$ = 1,310.21 | | | |
| | $d_{12}$ = 1.5 | | |
| $r_{14}$ = 101.65 | | | |
| | $d_{13}$ = 32.0 | 1.6385 | 55.5 |
| $r_{15}$ = −249.64 | | | |
| | $d_{14}$ = 2.5 | 1.6668 | 33.1 |
| $r_{16}$ = 193.75 | | | |
| | $d_{15}$ = 0.5 | | |
| $r_{17}$ = 50.96 | | | |
| | $d_{16}$ = 31.5 | 1.6385 | 55.5 |
| $r_{18}$ = 190.80 | | | |
| | $d_{17}$ = 14.0 | 1.7215 | 29.3 |
| $r_{19}$ = 23.31 | | | |
| | $d_{18}$ = 11.9 | | |
| $r_{20}$ = 59.89 | | | |
| | $d_{19}$ = 6.6 | 1.5633 | 50.8 |
| $r_{21}$ = 22.73 | | | |
| | $d_{20}$ = 13.7 | 1.7340 | 50.9 |
| $r_{22}$ = −602.5 | | | |
| | $d_{21}$ = 20.8 | 1.7340 | 41.0 |
| $r_{23}$ = ∞ | | | |

For the front element in Fig. 1 a glass is used having a mean refractive index $n_d$ = 1.5827 and an Abbe number of 46.5, whereas the convergent element of the second component is made of glass having $n_d$ = 1.6516 and an Abbe number of 58.5. It may be noted that the latter glass which is also used for the convergent element of the third component, though it is a lanthanumcrown and, hence, belongs to the class of the rare earth oxide glasses, has a relatively low refractive index and may be easily obtained at a price which is only slightly higher than the usual bariumcrown glasses. It is to be understood that the nomenclature used herein is based on the glass catalogue of Messrs. Schott und Genossen of Mainz and that, by other firms, the rare earth oxyde glasses may be designated as "special barium crowns and flints," as compared with the dense barium crown glasses having refractive indices substantially between 1.56 and 1.64.

In the example of Fig. 2 for the front lens and the convergent element of the second component glasses have been used having $n_d$ = 1.5831 and 1.6385 and Abbe numbers of 59.3 and 55.5, respectively. These too are barium crowns which are obtainable in large pieces at a moderate price. It will be noted that the convergent part of the rear component in this example is made of two lenses having a slightly curved cemented dividing surface which is concave to the front. This surface slightly improves the correction of colour and makes it possible to provide a rearmost element made of the glass $n_d$ = 1.7340, Abbe number 41.0, instead of the glass $n_d$ = 1.7340, Abbe number 50.9 used in the first example. The latter glass is slightly radio-active due to its thorium-contents and may cause fogging of the film in the focal plane when the lens is used for photographic purposes. Due to the equality in mean refractive index of the two rear lenses the surface does not influence monochromatic correction.

We claim:

1. An optical lens system for photography, projection and the like having a relative aperture larger than $f/1$, which system is corrected for a flat field and is made up of the following four components, listed in the order in which they are traversed by the light rays when the lens is used as a photographic objective:

a convergent single element front component;

a compound convergent second component made up of a convergent front and a divergent rear element and having the form of a meniscus which is convex towards the front;

a compound third component also having the form of a meniscus which is convex towards the front and being made up of a convergent front and a divergent rear element, the total axial thickness of this component being at least 0.35 $f$ where $f$ is the equivalent focal length of the system, the convergent element being made of a material having a mean refractive index not less than 0.04 lower than that of the divergent element;

a compound fourth component comprising a divergent front and a convergent rear part and having a convex front surface, the rear surface of the component having a radius of curvature not less than 2 $f$ and the total axial thickness of this component being at least 0.3 $f$, the front component having a convex front surface whose radius of curvature lies between $f$ and 2.2 $f$, the index of refraction of the glass of the front component being lower than 1.65 and that of the glass of the convergent element of the second component being lower than 1.675, the latter index being not less than 0.02 and not more than 0.04 lower than the refractive index of the glass of the divergent element of the second component, the radius of curvature of the dividing surface between the convergent and divergent elements of the second component lying between 1.5 $f$ and 3 $f$ and the axial thickness of the front element being smaller than 0.2 $f$, said lens system further satisfying the following inequalities:

$$|\phi_2| < 0.1\phi$$
$$0.6\phi < \phi_3 < 0.7\phi$$
$$-0.38\phi < \phi_5 < -0.31\phi$$
$$1.2\phi < \phi_6 < 1.35\phi$$
$$-3.4\phi < \phi_8 < -2.9\phi$$
$$0.9\phi < \phi_9 < 1.1\phi$$

wherein $\phi_2$, $\phi_3$, $\phi_5$, $\phi_6$, $\phi_8$, $\phi_9$ are the surface powers of the rear surface of the front component, the front and rear surfaces of the second and third components and the front surface of the fourth component, respectively and $\phi$ is the equivalent power of the lens system.

2. An optical lens system, comprising from the front to the rear, a cemented doublet convergent second component, a cemented doublet third component and a cemented doublet convergent fourth component, said system comprising substantially the following data:

[f=100]

| Radii of curvature | Axial Thickness or separation | Mean refractive index ($n_d$) | Abbe number |
|---|---|---|---|
| $r_1$ = 195.31 | | | |
| | $d_1$ = 16.20 | 1.5827 | 46.5 |
| $r_2$ = 2,456.65 | | | |
| | $d_2$ = 1.5 | | |
| $r_3$ = 102.40 | | | |
| | $d_3$ = 34.10 | 1.6516 | 58.5 |
| $r_4$ = −234.52 | | | |
| | $d_4$ = 2.6 | 1.6889 | 31.2 |
| $r_5$ = 199.70 | | | |
| | $d_5$ = 0.4 | | |
| $r_6$ = 51.28 | | | |
| | $d_6$ = 34.5 | 1.6516 | 58.5 |
| $r_7$ = 204.29 | | | |
| | $d_7$ = 13.6 | 1.7482 | 27.8 |
| $r_8$ = 22.39 | | | |
| | $d_8$ = 11.8 | | |
| $r_9$ = 53.08 | | | |
| | $d_9$ = 6.2 | 1.5633 | 50.8 |
| $r_{10}$ = 22.73 | | | |
| | $d_{10}$ = 29.4 | 1.7340 | 50.9 |
| $r_{11}$ = −332.57 | | | | wherein $r_1$ to $r_{11}$ designate the several radii of curvature of the lens surfaces numbered from the front to the rear, $d_1$ to $d_{10}$ the axial thicknesses and separations between the lens surfaces numbered from the front to the rear, and $f$ the equivalent focal length of the system.

3. An optical lens system, comprising from the front to the rear, a convergent single element front component, a cemented doublet convergent second component, a cemented doublet third component and a cemented triplet convergent fourth component, said system comprising substantially the following data:

[$f = 100$]

| Radii of curvature | Axial Thickness or separation | Mean refractive index ($n_d$) | Abbe number |
|---|---|---|---|
| $r_{12} = 176.74$ | | | |
| | $d_{11} = 15.14$ | 1.5831 | 59.3 |
| $r_{13} = 1,310.21$ | | | |
| | $d_{12} = 1.5$ | | |
| $r_{14} = 101.65$ | | | |
| | $d_{13} = 32.0$ | 1.6385 | 55.5 |
| $r_{15} = -249.64$ | | | |
| | $d_{14} = 2.5$ | 1.6668 | 33.1 |
| $r_{16} = 193.75$ | | | |
| | $d_{15} = 0.5$ | | |
| $r_{17} = 50.96$ | | | |
| | $d_{16} = 31.5$ | 1.6385 | 55.5 |
| $r_{18} = 190.80$ | | | |
| | $d_{17} = 14.0$ | 1.7215 | 29.3 |
| $r_{19} = 23.31$ | | | |
| | $d_{18} = 11.9$ | | |
| $r_{20} = 59.89$ | | | |
| | $d_{19} = 6.6$ | 1.5633 | 50.8 |
| $r_{21} = 22.73$ | | | |
| | $d_{20} = 13.7$ | 1.7340 | 50.9 |
| $r_{22} = -602.5$ | | | |
| | $d_{21} = 20.8$ | 1.7340 | 41.0 |
| $r_{23} = \infty$ | | | | wherein $r_{12}$ to $r_{23}$ designate the several radii of curvature of the lens surfaces from the front to the rear, $d_{11}$ to $d_{21}$ the axial thicknesses and separations between the lens surfaces numbered from the front to the rear, and $f$ the equivalent focal length of the system.

References Cited in the file of this patent
FOREIGN PATENTS

| 565,411 | Great Britain | Nov. 9, 1944 |
| 696,902 | Great Britain | Sept. 9, 1953 |
| 813,650 | France | Mar. 1, 1937 |
| 1,012,507 | France | Apr. 16, 1952 |